L. J. MUELLER, Jr.
DAMPER.
APPLICATION FILED MAY 8, 1911.

1,023,866.

Patented Apr. 23, 1912.

Witnesses:
Fred Palm
F. E. Dennett

Louis J. Mueller Jr.
Inventor:

By Flanders Bottum Fawsett Bottum
Attorneys.

UNITED STATES PATENT OFFICE.

LOUIS J. MUELLER, JR., OF MILWAUKEE, WISCONSIN.

DAMPER.

1,023,866.  Specification of Letters Patent.  Patented Apr. 23, 1912.

Application filed May 8, 1911. Serial No. 625,878.

*To all whom it may concern:*

Be it known that I, LOUIS J. MUELLER, Jr., a citizen of the United States, residing at Milwaukee, in the county of Milwaukee and State of Wisconsin, have invented certain new and useful Improvements in Dampers, of which the following is a specification, reference being had to the accompanying drawing, forming a part thereof.

This invention relates to dampers and similar valves and the objects of the invention are to provide constructions to hold dampers locked immovably in different positions of adjustment while at the same time permitting the position of a damper to be readily and easily changed.

Figure 1:
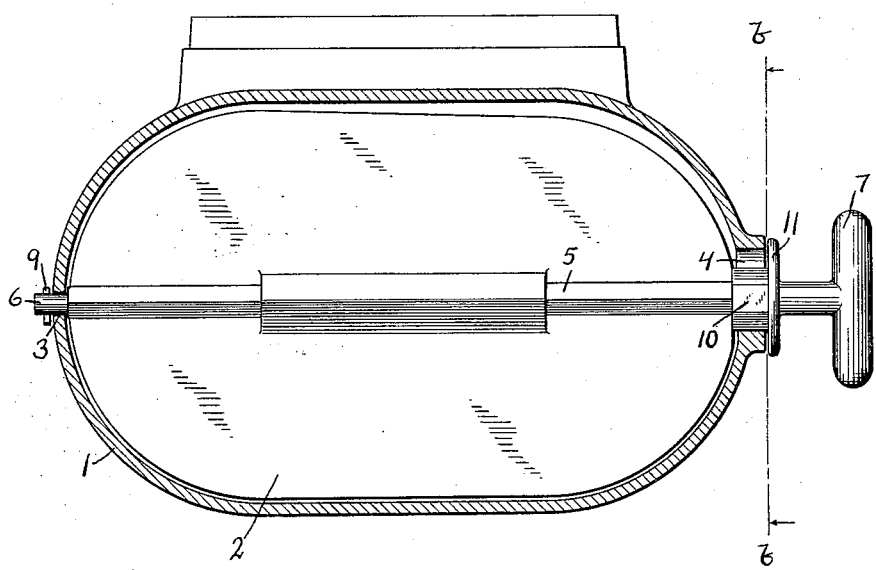
Figure 2:
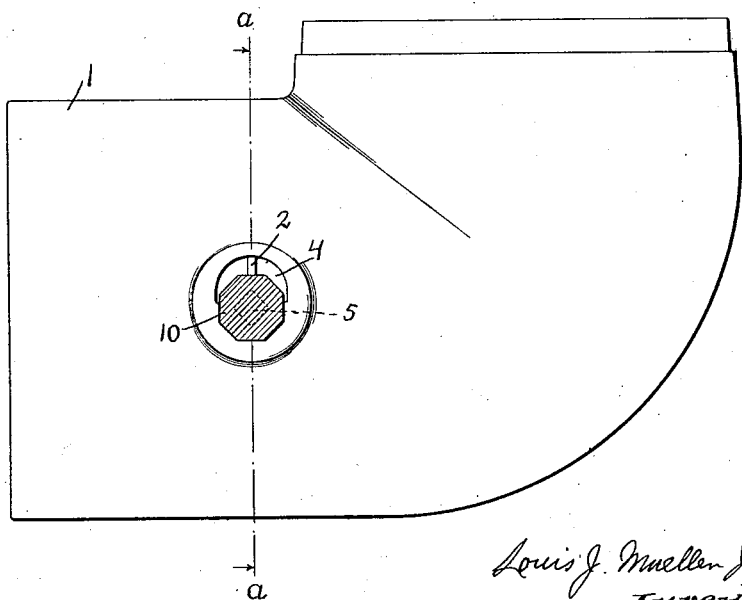

Referring to the drawings which accompany this specification and form a part thereof, which drawings illustrate an embodiment of this invention, and on which drawings the same reference characters are used to designate the same elements wherever they may appear in each of the several views, Figure 1 is a vertical, transverse sectional view of a flue having a damper therein, taken on the line $a$—$a$ Fig. 2, looking in the direction indicated by the arrows; and Fig. 2 is a side elevation of the flue taken on the line $b$—$b$ Fig. 1, looking in the direction indicated by the arrows, the damper shank or shaft being shown in section.

Referring specifically to the drawings, the reference numeral 1 designates a flue or conduit having a damper 2 located therein. The flue has two apertures 3 and 4 diametrically opposite each other and the damper shank or shaft 5 projects into each of said apertures as clearly shown by the drawings. The damper shank or shaft 5 may be formed separately from the damper or may be formed integrally therewith, and this specific construction forms no part of this invention. In the specific construction illustrated by the drawings the damper shank or shaft 5 is shown as a separate member to which the damper 2 is secured in a well known manner. The damper shank or shaft is formed into a cylindrical trunnion 6 at one end and is provided with a handle 7 at its other end. A cotter pin 9 may be used to prevent displacement of the parts. The damper shank 5 is provided with a part which is of polygonal shape in cross section and which is designated by the reference numeral 10. Preferably the cross sectional shape of this part 10 is that of a regular polygon of three or more equal sides depending on the number of different positions in which it may be desirable to lock the damper. By making the part 10 of a regular polygonal shape in cross section the damper can be turned entirely over to change the face presented to hot gases, for example, but it will be readily understood that practically only the bottom side of part 10 is required to be of regular polygonal shape. The upper part of aperture 4 is large enough for the part 10 to be revolved freely therein but the lower part of aperture 4 conforms in polygonal shape to the shape of the part 10 of the damper shank or shaft. A flange or washer 11 on the damper shank or shaft 5 covers the aperture 4.

The use of the construction is obvious. The flue 1 is set so that the polygonal part of the aperture 4 is lowermost. When the polygonal part 10 of the damper shank or shaft 5 is in its lower position, as shown by Fig. 2 of the drawings, the damper is securely locked against rotation either by the draft through the flue or by accidental blows against the handle. The damper can only be turned by first elevating the handle so that the polygonal part 10 on the damper shank can be revolved in the enlarged upper part of aperture 4.

What is claimed is:

1. The combination with a flue provided with a substantially vertical elongated aperture, the lower part of which is of polygonal shape and the upper part of which is larger than the polygonal-shaped lower part, of a damper provided with a polygonal-shaped damper shank adapted to rest within the lower polygonal-shaped part of said aperture in the flue to hold the damper immovably locked in position, the said polygonal-shaped damper shank being adapted to be lifted into the upper larger part of said aperture and to be rotated therein, whereby the adjustment of the damper may be changed.

2. The combination with a flue provided with a substantially vertical elongated aperture, the lower part of which is of polygonal shape and the upper part of which is larger than the polygonal-shaped lower part, of a damper provided with a polygonal-shaped damper shank adapted to rest within the lower polygonal-shaped part of said aperture in the flue to hold the damper immovably locked in position, the said polygonal-shaped damper shank being adapted to be lifted into the upper larger part of said aperture and to be rotated therein, whereby the adjustment of the damper may be changed, and a flange on the damper shank to cover the aperture in the flue.

In witness whereof I hereto affix my signature in presence of two witnesses.

LOUIS J. MUELLER, Jr.

Witnesses:
JOSEPH H. BOLZINGER,
EDWIN S. SEIMS.

Copies of this patent may be obtained for five cents each, by addressing the "Commissioner of Patents, Washington, D. C."